United States Patent [19]
Illbruck et al.

[11] Patent Number: 5,633,067
[45] Date of Patent: May 27, 1997

[54] ENGINE COMPARTMENT CASING ELEMENT WITH PERFORATED FOAM LAYER

[75] Inventors: Michael Illbruck, Leverkusen; Albert Kallenberg, Hürth; Günter Arnold; Uwe Etterer, both of Leichlingen, all of Germany

[73] Assignee: Illbruck Production S.A., Courgenay, Switzerland

[21] Appl. No.: 161,219

[22] Filed: Dec. 2, 1993

Related U.S. Application Data

[63] Continuation of Ser. No. 936,184, Aug. 26, 1992, abandoned.

[30] Foreign Application Priority Data

Aug. 26, 1991 [DE] Germany .................. 9110552 U

[51] Int. Cl.$^6$ ............... B60R 13/08; B32B 3/24; E04B 1/86
[52] U.S. Cl. ............ 428/138; 428/131; 428/116; 428/71; 428/72; 428/73; 428/198; 428/158; 428/178; 428/166; 428/213; 428/220; 428/338; 428/332; 428/314.4; 428/319.3; 428/318.8; 181/294; 181/204; 181/288; 181/290; 181/291; 181/292; 296/39.3; 123/198 E; 123/195 C
[58] Field of Search ................ 428/131, 138, 428/116, 71, 72, 73, 148, 158, 178, 166, 213, 220, 338, 332, 314.4, 319.3, 318.3; 181/294, 204, 288, 290, 292, 291; 296/39.3; 123/198 E, 195 C

[56] References Cited

U.S. PATENT DOCUMENTS

| | | | |
|---|---|---|---|
| 2,087,248 | 7/1937 | Fischer | 181/291 |
| 2,990,027 | 6/1961 | Sabine | 181/291 |
| 3,905,443 | 9/1975 | Sieuzac | 181/291 |
| 3,966,526 | 6/1976 | Doerkling | 428/138 |
| 4,013,302 | 3/1977 | Oswald | 280/154.5 R |
| 4,248,647 | 2/1981 | Herron et al. | 181/291 |
| 4,253,543 | 3/1981 | Johansson | 428/172 |
| 4,301,890 | 11/1981 | Zalas | 181/291 |
| 4,340,129 | 7/1982 | Salyers | 428/131 |
| 4,469,736 | 9/1984 | Machhholz | 428/159 |
| 4,584,232 | 4/1986 | Frank et al. | 428/159 |
| 4,782,913 | 11/1988 | Hoffmann et al. | 181/291 |

FOREIGN PATENT DOCUMENTS

| | | |
|---|---|---|
| 131616 | 3/1987 | European Pat. Off. . |
| 0213322 | 3/1987 | European Pat. Off. . |
| 0266726 | 5/1988 | European Pat. Off. . |
| 0316744 | 5/1989 | European Pat. Off. . |
| 7730604 | 6/1978 | France . |
| 3219339 | 3/1983 | Germany . |
| 2167020 | 5/1986 | United Kingdom . |

OTHER PUBLICATIONS

Kurtze, "Physik und Yechnik der harmbek ampting" (1964) G. Braun, Karlsruhe, Germany p. 159.

*Primary Examiner*—William Watkins
*Attorney, Agent, or Firm*—Martin A. Farber

[57] ABSTRACT

An engine compartment casing element (1), in particular for sound absorption, with a foamed material element (2) attached to a wall element (3) which is preferably reverberant, the foamed material element (2) having a skin-like covering (5) on the side facing away from the wall element (3). The foamed material element (2) is perforated, the foamed material element (2) is also covered on both sides with an air-impermeable plastic sheeting (5) or (6) respectively which also covers the perforated areas (holes 4), and the foamed material element (2) is installed so that it runs at least in part at a distance (a) from the wall element (3).

21 Claims, 6 Drawing Sheets

ENGINE COMPARTMENT CASING ELEMENT WITH PERFORATED FOAM LAYER

RELATED APPLICATION

This application is a continuation of our application Ser. No. 07/936,184 filed: Aug. 26, 1992 abaondoned.

FIELD AND BACKGROUND OF THE INVENTION

This invention concerns an engine compartment casing element, in particular for sound absorption, with a foamed material element attached to a wall element which preferably reflects sound, the foamed material element having a skin-like covering on the side facing away from the wall element, the side exposed to the sound waves.

Such an engine compartment casing element is known from European patent 131 616 for example. In that patent the foamed material element consists of foamed material throughout. The foamed material has the same thickness and is free of perforations throughout. A sealed-in grid layer is provided to stabilize the foamed material. It is also known that elements absorb airborne noise by placing sheeting on a hump-like design of an insulating material, for example a foamed material, so the sheeting can basically vibrate freely. In this regard, reference is made to French patent 77 30 604 and German patent 32 19 339 as examples. Furthermore, it is also known from Kurtze, Physik und Technik der Lärmbekämpfung (Physics and Technology of Noise Control), published by G. Braun, Karlsruhe, 1964, page 159, that sheeting which is supported on the edges by porous soundproofing material is to be provided in the case of sheet resonators attached directly to a wall surface.

SUMMARY OF THE INVENTION

It is an object of the invention to provide an improved engine compartment casing element based on this state of the art. According to the invention an engine compartment casing element is provided wherein the foamed material is perforated, that the foamed material element is also covered on both sides by an air-impermeable foil (sheeting) which also covers the perforations, and that the foamed material element is installed so that it extends at least in part at a distance from the sound reflecting wall element. Both sides of the perforated foamed material element can easily be covered with the air-impermeable foil. In addition, the absorber created in this manner is highly effective. Moreover, an absorber element created in this manner can be easily fastened to the sound reflecting wall element. As well, the inherent rigidity of the absorber element is adequate enough for it to extend in part at a distance from the wall element, providing favorable reinforcement for the sound absorption or sound insulation too. As the air-impermeable foil is preferably very thin, for example 25 to 60μ, there is both an absorption effect and sound insulation as a result of reflection. The foamed material can be closed-pored or, preferably, open-pored. The closed-pored or open-pored foamed material should also be flexible. The perforations comprise preferably uniformly distributed holes. It is also possible that the air-impermeable foil exhibits a certain indentation which is slightly indented in the regions of the perforated areas. In this regard, however, it is advantageous if the air-impermeable foil itself is not under tension. The indentation depends on the properties (flexibility) of the air-impermeable foil used and, if relevant, also on the manufacturing process used. However at present an embodiment is preferred in which the air-impermeable foil covers the holes without any marked indentation. It is advantageous for the holes to be circular, but they can also be oval, or square, or be of any other suitable shape. In a cross-sectional view of the foamed material element covered with the air-impermeable foil on both sides, the holes and web areas between the holes are approximately of the same length. The intermediate webs vary in length where the hole pattern deviates from the preferred variation. For example, the holes can have diameters from 1 to 4.5 cm, preferably 2.5 cm. The hole spacing (from center point to center point) is approximately 45 mm. A preferred embodiment is to design the wall element in areas in which the foamed material element covered with the air-impermeable foil on both sides is not attached to the wall element in such a way that very different frequency ranges are absorbed as a result of varying distances between the wall and the foamed material element. The air volume enclosed between the foamed material element covered with the air-impermeable foil on both sides and the wall element acts as a spring, while the foamed material element acts as a mass, in a mass-spring system. For example, the shape of the wall element can be graduated to fit that of the foamed material.

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
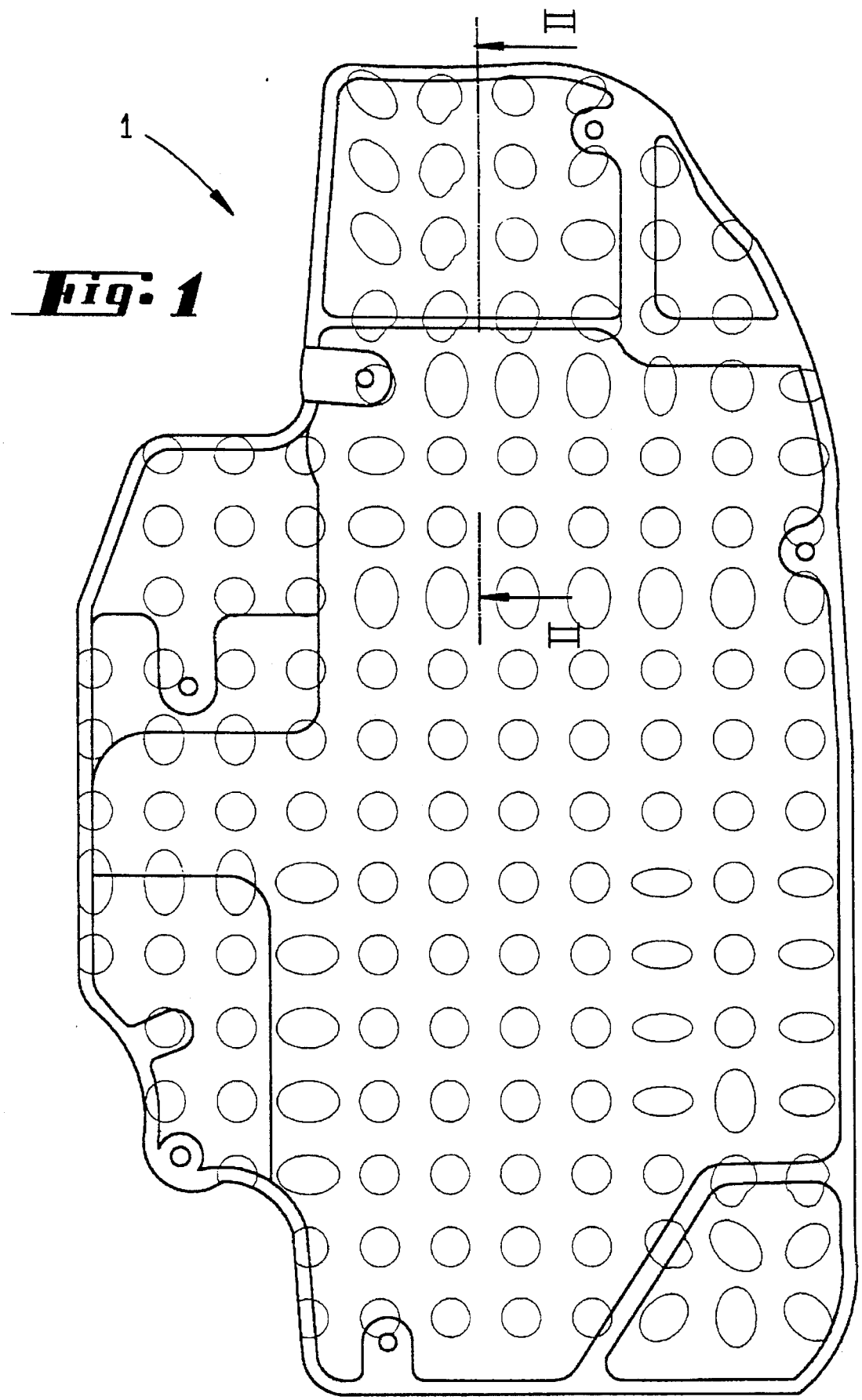
FIG. 1 is a top view of the side of the engine compartment casing element facing the noise source.

Illustrated and described is an engine compartment casing element 1 which comprises a foamed material 2 made of open-pored foamed material covered with an air-impermeable foil 5, 6 (such as for example a plastic sheeting) on both sides. However, closed-pored flexible foamed material can also be used. The foamed material element 2 is attached to a wall element 3 which reflects sound in the embodiment. The foamed material element 2 also has holes 4. In addition, the entire surface of the foamed material element 2 is covered, including the perforated areas of the holes 4, by the upper and lower air-impermeable foils 5 and 6 respectively. The air-impermeable foils can be very thin, for example 25 to 60μ thick. For example, a modified polyester or PUR air-impermeable foil, in particular, is suitable for this purpose, also a composite air-impermeable foil made of the above air-impermeable foils. The thickness of the air-impermeable foil is exaggerated in the drawings to provide a better illustration.

The preferred foamed material is melamine resin foamed material.

The foamed material element 2 covered with the air-impermeable foils on both sides runs in part, for example in the area 7, at a distance a from the wall element 3.

Figure 2:
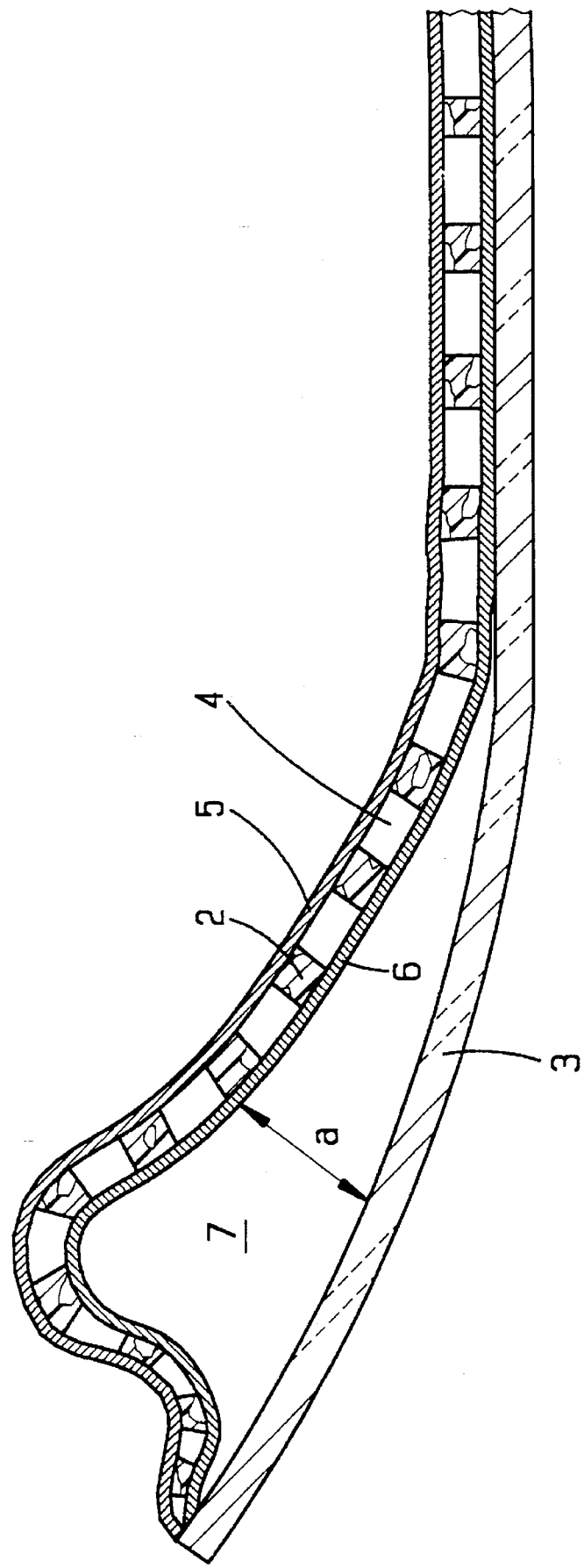
FIG. 2 is a cross-section through the engine compartment casing element illustrated in FIG. 1 approximately along Line II—II.
Figure 3:
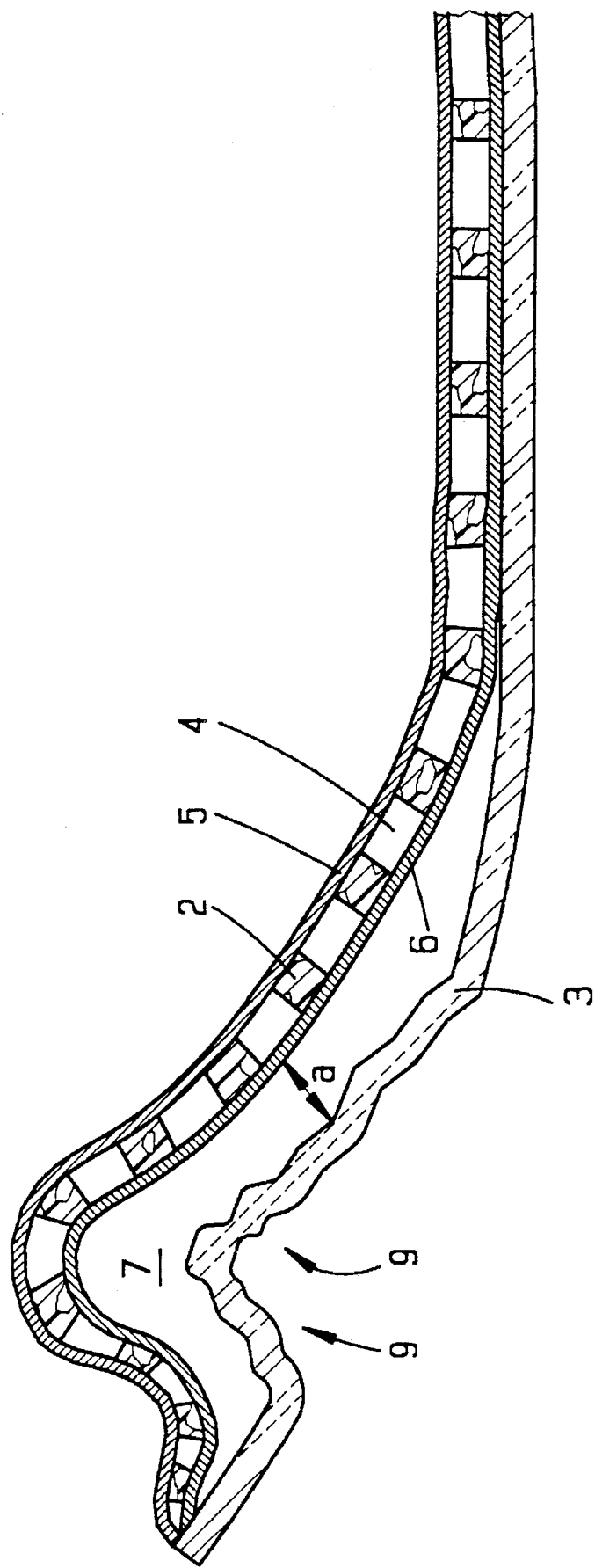
FIG. 3 is an illustration in accordance with FIG. 2 with a modified wall element.

It is preferred that the air-impermeable foil covers the holes 4 in a straight line over each hole, as illustrated in FIGS. 2 and 3 (the thickness is greatly exaggerated in both drawings).

Figure 4:
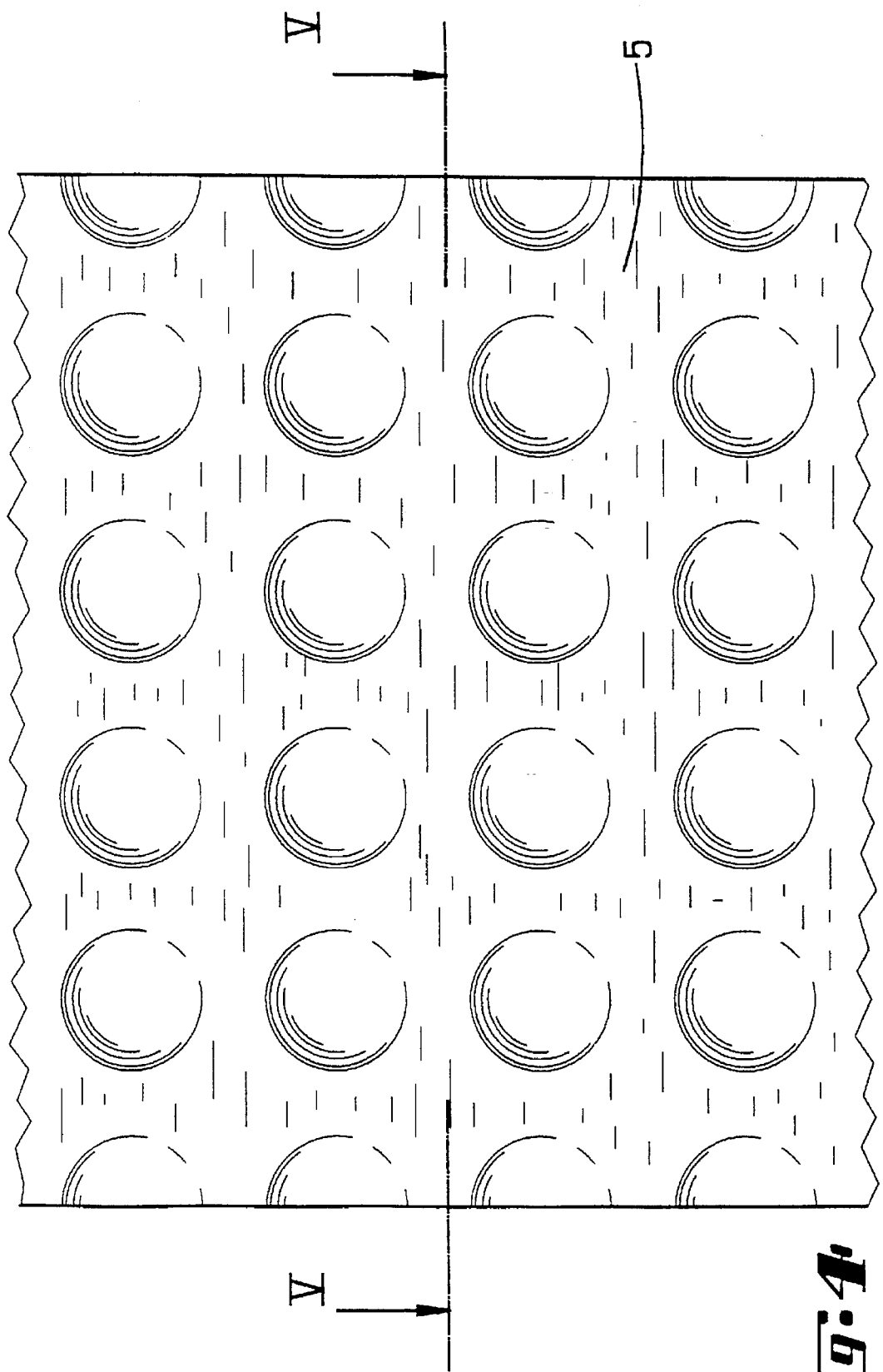
FIG. 4 is a detailed top view of the foamed material element covered with an air-impermeable foil on both sides.
Figure 5:
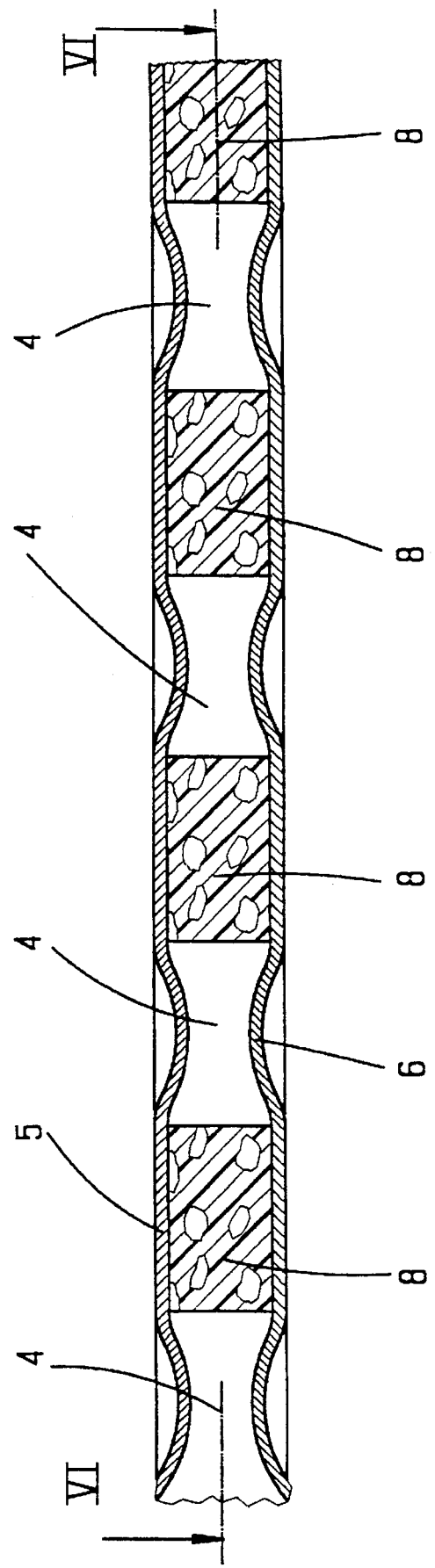
FIG. 5 is a cross-section through the object illustrated in FIG. 4 taken along the Line V—V of FIG. 4.
Figure 6:
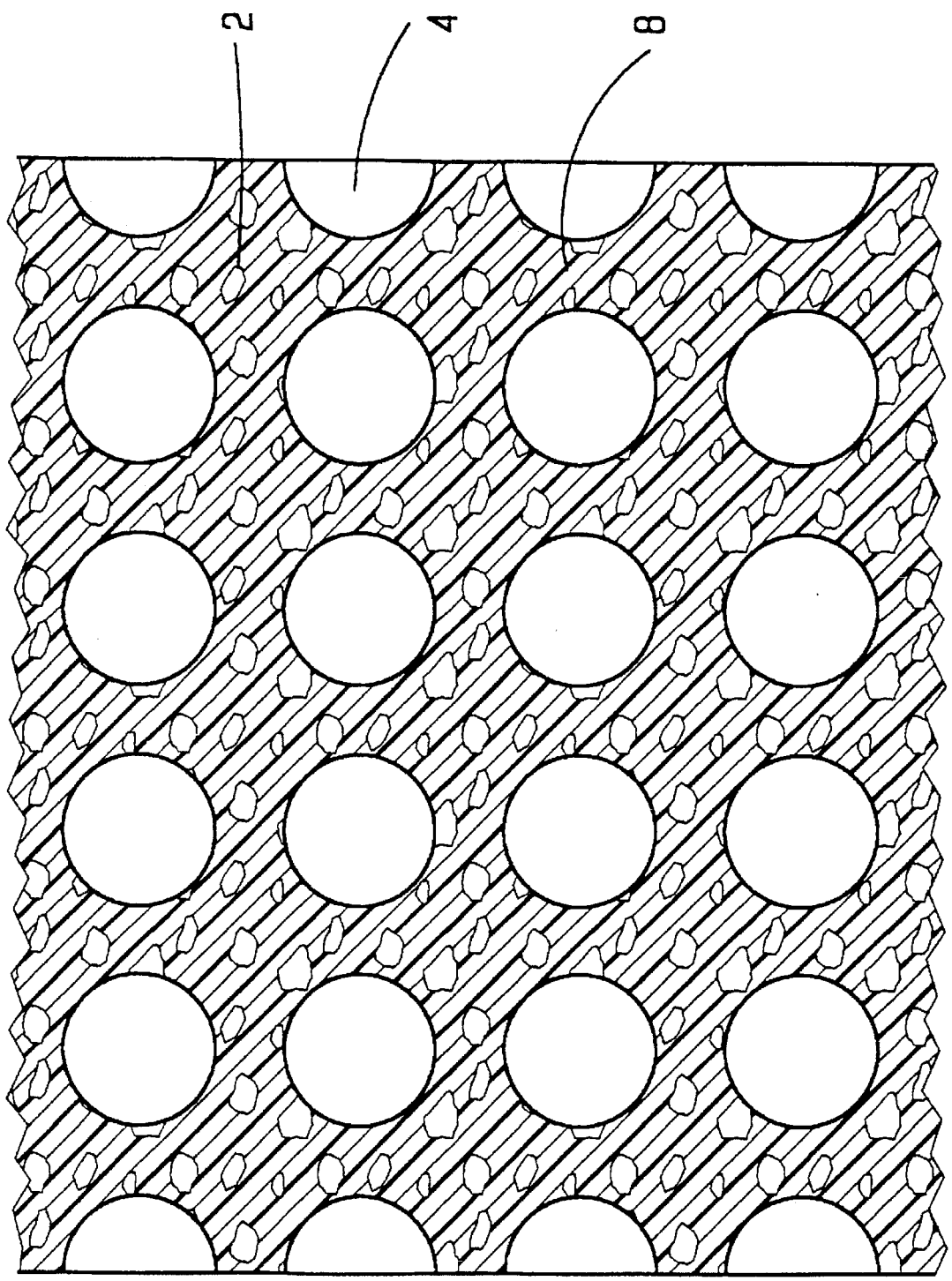
FIG. 6 is a cross-section through the object illustrated in FIG. 5 taken along Line VI—VI of FIG. 5.

As FIGS. 4 and 5 show, however, the air-impermeable foils 5 or 6 respectively can easily be drawn inwards (the curve being greatly exaggerated in this case too for better illustration) towards each other in the area of the holes 4. This results in a slight indentation of the air-impermeable foil at each hole area. However the air-impermeable foil is essentially flat in the area of each foamed material web 8.

The areas which are in part not circular in FIG. 1 result from the deformation of the foamed material element and the change in perspective also resulting from this.

As can also be seen from the illustration in FIG. 3 in particular, graduated (step-like) configurations 9 of the wall element 3 can be provided at a distance from the foamed material element 2 which curve inwardly towards the foamed material element 2 in the embodiment. This results in the engine compartment casing element absorbing a broad range of frequencies.

In addition, the holes 4 are circular in the embodiment. As can also be seen from the illustration in FIG. 5 in particular, they are distributed uniformly in the foamed material element 2. The holes 4 can also be distributed irregularly but preferably have the same percentage of perforations as illustrated. The percentage of perforations is approximately 24%. This is attained in the embodiment by a hole spacing of about 45 mm. The hole spacing (from center point to center point) is the same for adjacent holes in two directions perpendicular to one another. The holes have a diameter of about 2.5 cm. The intermediate webs 8 are approximately the same in length.

In total the result is a highly effective, broad-band absorber. In addition, an advantageous lightweight construction is also realized, resulting from the given inherent stability of the foamed material covered with the air-impermeable foils on both sides. In particular, such an engine compartment casing element 1 is also virtually impermeable to liquids, because preferably waterproof air-impermeable foils are selected, as it is in the embodiment, for the air-impermeable foils 5 and 6.

The sound engineering operation of this engine compartment casing element 1 can also be described as follows.

The sound pressure waves hit the air-impermeable foils, i.e., the air-impermeable foil 5 and the flexible, vibratory system, which is installed at a distance from the sound reflecting and rigid wall element 3, can vibrate. The vibration produced compresses and expands the enclosed air volume which also acts like a resonance spring.

Sound is absorbed mainly by converting sound pressure into kinetic energy and by annihilation between the wave trains, i.e. partial cancellation of the sound waves by phase retardation.

The acoustic characteristic impedance is favorably influenced by the perforations. The air-impermeable foils which cover not only the foamed material 2 on both sides but also the holes 4 represent an additional vibratory foil absorber. The air volume enclosed within the holes can work like a spring, compressing and expanding. In addition, however, energy can also be diverted into the open porous perforated walls of the foamed material 2 and, therefore, into the foamed material 2 itself.

The compressive strength and the specific gravity of the foamed material used are also important. The compressive strength is preferably in the 3–13 range, specifically 8 kPa., and the specific gravity is preferably 9–17, specifically 13 kilograms per megacubic.

We claim:

1. An engine compartment casing element for sound absorption, comprising a wall element, a sound absorbing laminate supported by said wall element, wherein said laminate comprises a foamed material element having perforations extending through said foamed material element from each side thereof to the opposite side thereof, cross sectional dimensions of respective ones of said perforations being greater than or approximately equal to the depths of the respective perforations, said laminate further comprises continuous air-impermeable foils disposed on and contacting opposite sides respectively of said foamed material element, said foils covering said perforations in the foamed material element, and within said engine compartment, a region of said laminate extends continuously spaced apart from the wall element, and has a rigid curvature providing contact between a periphery of the laminate region and the wall element.

2. The engine compartment casing element according to claim 1, wherein the foamed material element is open-pored.

3. The engine compartment casing element according to claim 1, wherein the foamed material element is closed-pored.

4. The engine compartment casing element according to claim 1, wherein the perforations of said foamed material element comprise uniformly distributed holes.

5. An engine compartment casing element according to claim 1, wherein the perforations are circular.

6. An engine compartment casing element according to claim 1, wherein the wall element itself varies in a step shape and is disposed at a distance from the foamed material element whereby a broad range of frequencies are absorbed, and said laminate of said foamed material element with said foils has inherent rigidity.

7. An engine compartment casing element according to claim 1, wherein said foamed material element forms web areas between the perforations, the perforations and the web areas have approximately the same length in cross-section.

8. An engine compartment casing element according to claim 1, wherein the perforations of said foamed material element have a hole diameter about 1 to 3 cm.

9. An engine compartment casing element according to claim 1, wherein the perforations of said foamed material element have a hole diameter approximately 2.5 cm.

10. An engine compartment casing element according to claim 1, wherein each of said air-impermeable foils is slightly indented into each perforation of said foamed material element.

11. An engine compartment casing element according to claim 1, wherein said wall element is sound reflecting.

12. An engine compartment casing element for sound absorption, comprising a wall element, a foamed material element adapted to cooperate with a wall element of the engine compartment, the foamed material element being perforated forming perforations extending completely through said foamed material element from each side thereof to the opposite side thereof, cross sectional dimensions of respective ones of said perforations being greater than or approximately equal to the depths of the respective perforations, a continuous air-impermeable foil in continuous contact with and covering each side of said foamed material element and also covering all said perforations which extend through the foamed material element to form a laminate, and wherein within said engine compartment, a region of said laminate extends continuously spaced apart from the wall element, and has a rigid curvature providing contact between a periphery of the laminate region and the wall element.

13. An engine compartment casing element according to claim 12, wherein said casing element includes said wall element, said foamed material element is spaced from said wall element at varying distances, whereby broad acoustic frequency ranges are absorbed as a result of the varying distances.

14. An engine compartment casing element according to claim 12, wherein said foamed material element is melamine resin foamed material.

15. An engine compartment casing element according to claim 12, wherein said air-impermeable foil covers said perforations in a straight line over said perforations.

16. An engine compartment casing element according to claim 12, wherein said air-impermeable foil is between 25 to 60μ, whereby there is both an absorption effect and sound insulation as a result of reflection.

17. An engine compartment casing element according to claim 12, wherein said air-impermeable foil covers each side of said foamed material element free of tension.

18. An engine compartment casing element according to claim 12, wherein said air-impermeable foil is waterproof.

19. An engine compartment casting element according to claim 12, wherein said foamed material element with said air-impermeable foil on each side vibrates compressing and expanding air volumes which are enclosed in said perforations and act as a resonance spring compressing and expanding.

20. An engine compartment casing element for sound absorption, comprising:

a foamed material element having perforations, the apertures extending through said foamed material element from each side thereof to the opposite side thereof, the foamed material element being flexible and having an inherent rigidity to be self-supporting, cross sectional dimensions of respective ones of said perforations being greater than or approximately equal to the depths of the respective perforations;

a continuous air-impermeable foil contiguous to and covering each side of said foamed material element and also covering said perforations which extend through the foamed material element;

wherein each of said air-impermeable foils is indented into each perforation of said foamed material element and flatly covers residual surface area of the foamed material element to form with said foamed material a laminate; and a region of said laminate has a curvature adapted to provide contact with an outer wall of said engine compartment along a periphery of said region while maintaining a spacing between said wall and a center of said region.

21. A method of absorbing sound present within a compartment bounded by a wall, the wall being reflective of sound waves, the method comprising the steps of:

providing a perforated layer of foamed material, said layer providing step including a step of introducing a curvature to a region of said layer for offsetting said layer region from a corresponding region of said wall, said perforated layer having perforations opening at a first surface of said layer and at a second surface of said layer, said second surface being opposite said first layer, cross sectional dimensions of respective ones of said perforations being greater than or approximately equal to the depths of the respective perforations, a ratio of the total cross sectional areas of said perforations to the area of said foamed material element being approximately 24%;

laminating a first and a second continuous air-permeable foil contiguous to respectively said first and said second surfaces of said layer to provide a laminate;

placing said laminate upon a surface of said wall within said compartment, said curvature of said layer preventing contact of said laminate with said wall region except at a periphery of said layer region wherein contact is obtained between said laminate and said wall region, said placing step providing a composite structure of said laminate and said wall for absorption of sound within the compartment.

* * * * *